Figure 1:
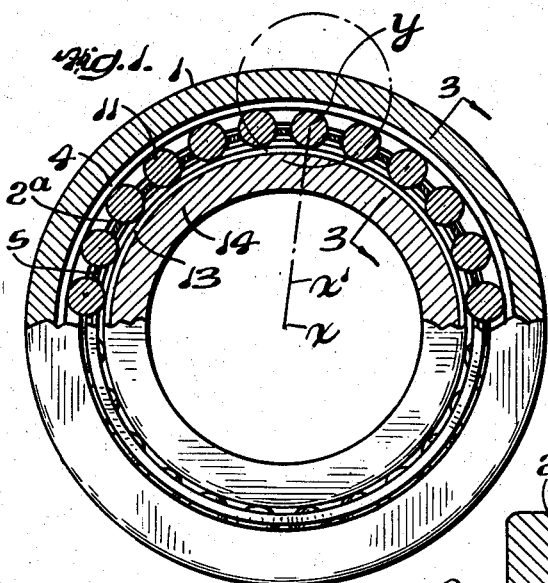

April 28, 1959 K. L. HERRMANN ET AL 2,884,288
NEEDLE ROLLER BEARINGS
Filed Aug. 31, 1951 3 Sheets-Sheet 1

INVENTORS
KARL HERRMANN
BY VICTOR L. BARR
GERALD A. HENWOOD
THEIR ATTORNEY

April 28, 1959  K. L. HERRMANN ET AL  2,884,288
NEEDLE ROLLER BEARINGS
Filed Aug. 31, 1951  3 Sheets-Sheet 2
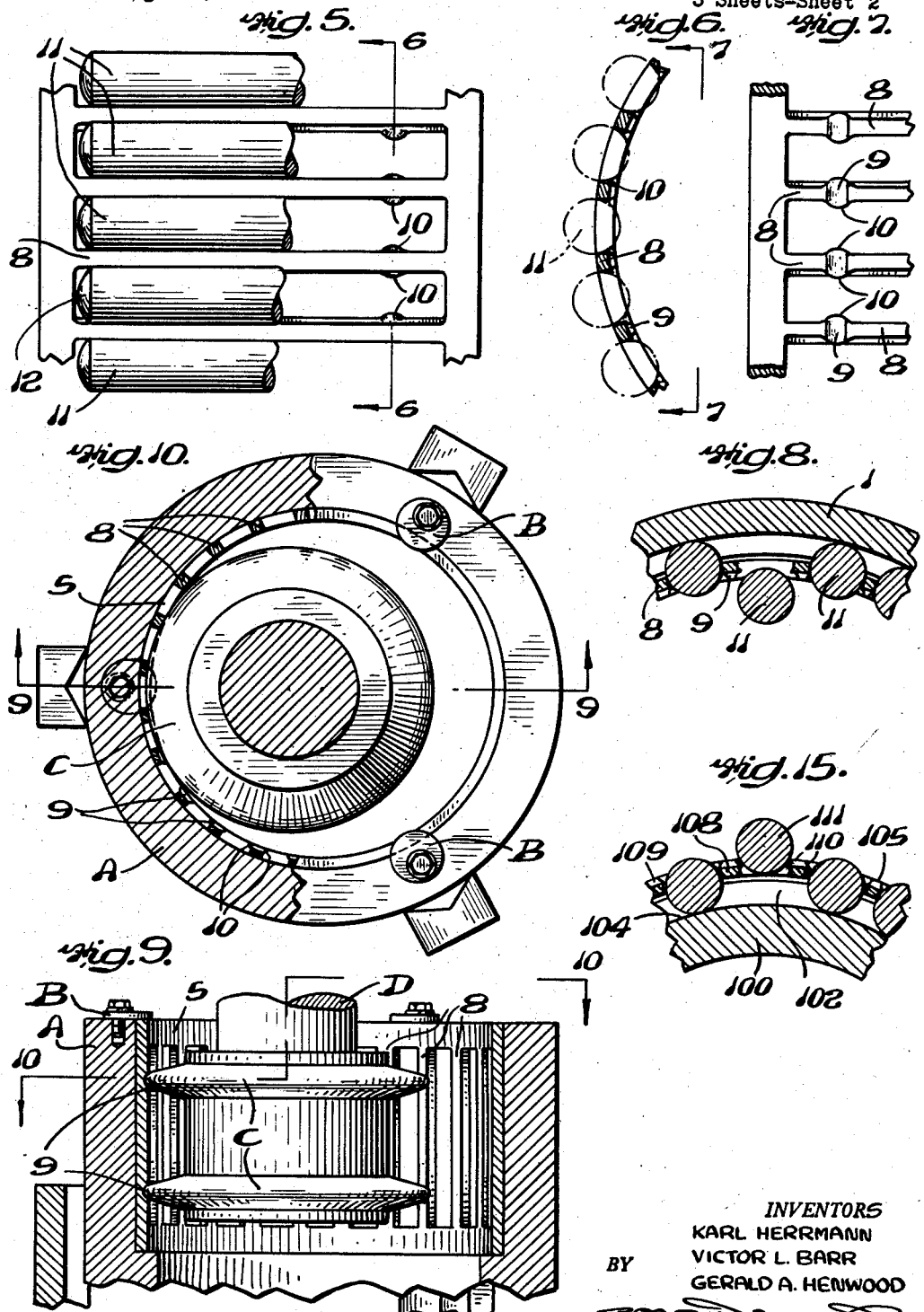
INVENTORS
KARL HERRMANN
VICTOR L. BARR
GERALD A. HENWOOD
BY
THEIR ATTORNEY

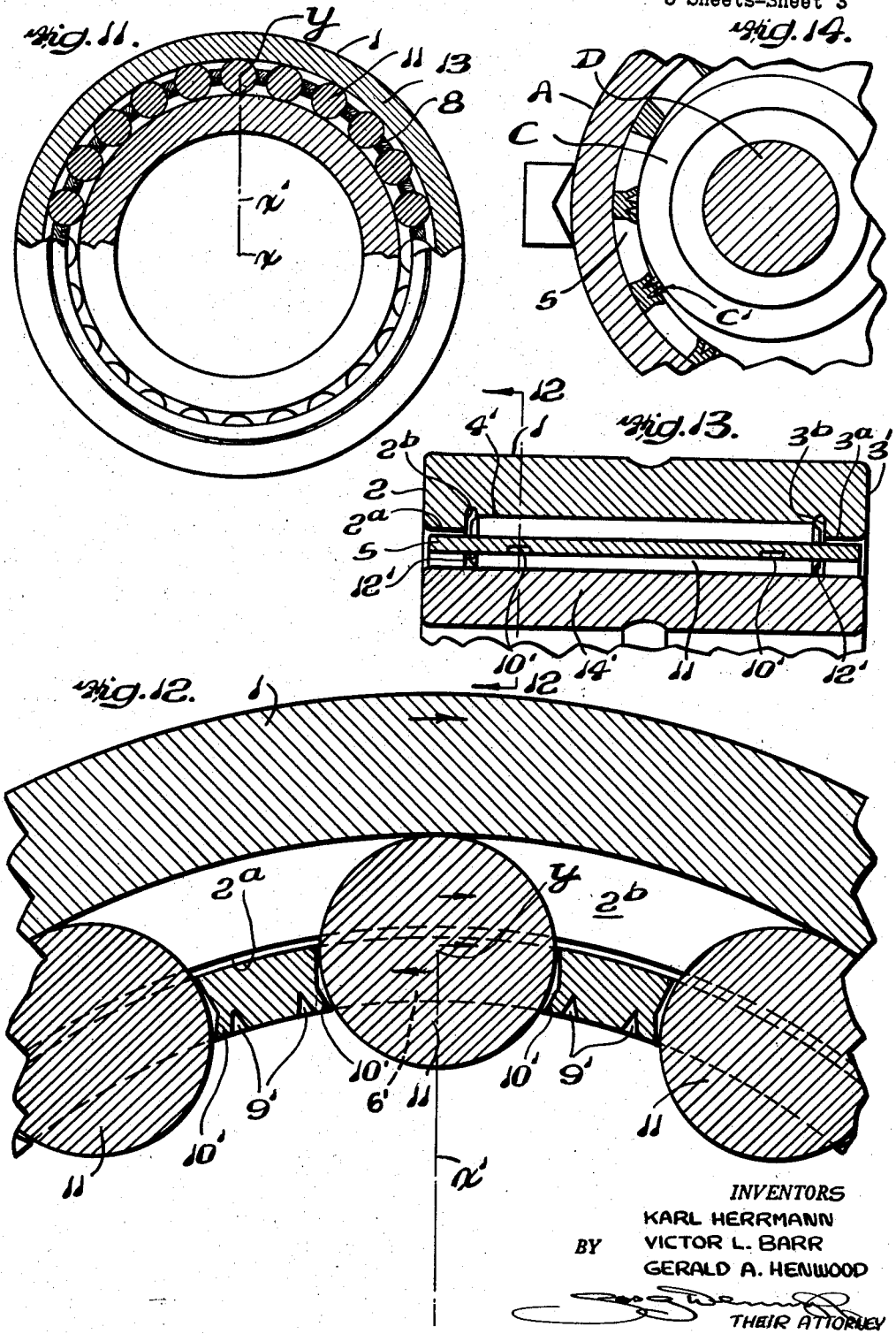

United States Patent Office 2,884,288
Patented Apr. 28, 1959

2,884,288

NEEDLE ROLLER BEARINGS

Karl L. Herrmann, Glendale, Calif., and Victor L. Barr, Philadelphia, and Gerald A. Henwood, Bristol, Pa., assignors to Roller Bearing Company of America, Trenton, N.J., a corporation of New Jersey Application August 31, 1951, Serial No. 244,486

10 Claims. (Cl. 308—213)

Our invention is an improved roller bearing having rotatable cylindrical rollers revolving in a cylindrical orbit and is designed to provide long life and large load carrying capacity relative to the radial space occupied by the bearing.

Our improvements are particularly applicable to the type of cylindrical roller bearings commonly known as needle bearings, in which the rolls used are of relatively small diameter in proportion to their length, viz: the length of the roller is at least three times its diameter and the diameter does not ordinarily exceed 5 mm. Such bearings support heavy radial loads and may permit axial adjustments between the shaft and housing, but the lengths of the rollers render them particularly susceptible to cocking in the same or in reverse directions upon any deflection of a shaft or any misalignment of the shaft with a complementary housing, or if the ends of the rollers or of the guides therefor are at all asymmetrical.

Even where roller ends and ribs or rims for guiding them are all symmetrical, we have found that desired epicyclic movement of a roller is hindered or impaired by the engagement of a radially extending continuous surface of a guiding rib or a guiding rim with roller-end contact points moving transversely to an orbital radius, and oppositely to one another, within and without the pitch circle along which the roller axis travels orbitally.

The incorporation of cages in such bearings have heretofore been of little benefit regardless of whether the roller ends and guides are symmetrical or asymmetrical. A split cage lacks strength and uniformity and a one piece cage has ordinarily necessitated major deformation of the cage structure after assembly or the use of a separable rib on a race ring. Cages riding on rollers tend to cause the rollers to climb sides of the cage pockets with resulting wedging, drag and wear, and tend to transmit the cocking of any roller to other rollers, with consequent axial thrust and rapid deterioration and destruction of the rollers and cage. Cages having rims between the roller-ends and side ribs of race rings are subject to irregular pinching, cramping and retardation, with resulting distortion of structure and operation.

We have found that rollers having symmetrical ends may be controlled with maximum efficiency and minimum stress by peripheral guidance thereof at or about their pitch circle by, or adjacent to, corners of bars of a cage supported independently of the rollers and substantially devoid of vibratory or resonant elements or characteristics, and the guidance of the symmetrical ends, transverse to the periphery, at points both within and without the pitch circle and in close proximity thereto but without engagement, at any given instant, of any substantial end areas both within and without the circle with a continuous surface of either a rib or rim.

Such guidance is effected by symmetrical race-ring side ribs and equi-diametral symmetrical cage rims rotatable relatively thereto; the rims being connected with one another by bars which are normally rigid but resilient under assembly pressure. The ribs and rims have complementary annular faces with a line of juncture between them approximately coincident with the pitch circle in which the axes of the rollers revolve in their orbital movement. The rotation of each roller on its own axis results in a movement (at a given instant) of an end surface area, outside the pitch circle and adjacent to an orbital radius, in the same direction as the orbital movement of the roller and such area is guided by contact with a radial surface (of rib or rim) in a plane transverse to the orbital axis. The end surface within the pitch circle and adjacent (at the same instant) to the same orbital radius simultaneously moves contra to the direction of orbital movement of the roller and is guided by contact with a radial surface (of rim or rib) in a plane transverse to the orbital axis. Since the respective surfaces engaged by the oppositely moving roller-end areas are relatively movable, the reverse stresses are absorbed without impairment of the smoothness of the rolling motion of the roller, particularly when each roller end is so convexed that the end areas contacting the guides are close to the roller axis as well as to the pitch circle.

Our improvements are preferably embodied in a cylindrical needle bearing having a tubular guiding cage having symmetrical end rims with equi-diametral, annular faces overlying annual faces of symmetrical side ribs of a race ring so that the rims of the cage make a slip fit with such rib faces and the line of juncture between the rims and ribs is approximately coincident with the pitch circle of the axes of rotation of rollers inserted into the raceway of the race ring through slots or windows in the cage. Each roller has symmetrical ends guided by radial surfaces of the ribs and rims extending transversely to the orbital axis of the bearing.

While it is preferred that the line of juncture between the ring ribs and the cage rims be coincident with the pitch circle of the axes of rotation of the rollers, it is tolerable for many uses that such line of juncture lie within an annular zone having a radial width on either side of the pitch circle not exceeding 10% of the diameter of a roller and we have therefore designated the positioning of parts within such zone as approximately coincident with the pitch circle.

The cage consists of a tubular shell of sheet material having a thickness no greater than one-third of the diameter of the rollers and a coefficient of expansion substantially the same as that of the race ring. Preferably both cage and rollers are made of steel.

The cage is punched to form windows spaced by bars of greater circumferential width than radial thickness, and each window has a circumferential width slightly greater than the diameter of a roller and an axial length no greater than the axial length of the raceway between the ribs so as to leave an unbroken, continuous rim on each side of the cage for making a smooth slip fit with the respective ring ribs and overlie the same.

The windows are preferably formed by forcing a parallel-sided punch into the cage material from the surface thereof destined to be adjacent to the raceway of the ribbed ring in the assembled bearing. This insures the parallelism of the bar walls on opposite sides of a window, at least to the extent that such walls are contacted by a roller in the window during reverse revolutions of the bearing. The point of contact of each roller with its complementary bar wall is adjacent to a cylindrical plane approximately coincident with the pitch circle and either on the outside corner of the bar or less than half the radial thickness of the bars away from the peripheral surface thereof nearer to the raceway lying between the ring ribs.

Both the cage rims and the inner and outer surfaces of the cage body between the rims should be substantially free from projections beyond the general contour of the inner and outer peripheral walls of the cage. Where roller retainers are required or desired, these may be formed by swaging the cage bars from the surfaces thereof remote from the raceway so as to displace laterally small ears into the windows within the general contour of the cage, and preferably out of contact with the rollers in their normal operating positions to avoid vibration, resonance, heating and thermal stresses in the cage.

The rollers may be, and preferably are, of random lengths and have symmetrical convex ends, which may be hemispherical or may be rounded by tumbling or may be chamfered at an angle up to, say, 45° so as to avoid the formation of trunnions or pintles which materially diminish the effective length of the rolling surfaces of the rollers. The curved ends generally wear sufficiently to form parallel flat areas adjacent to the axis.

The principles of our invention, and the best manner in which we have contemplated applying such principles, will further appear from the following description and the accompanying drawings in illustration thereof, which are on a greatly exaggerated scale both as to size of the parts and the clearances between some of them.

Figure 2:
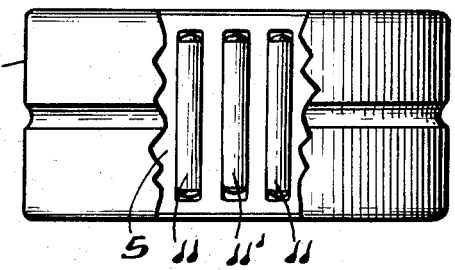
Figure 3:
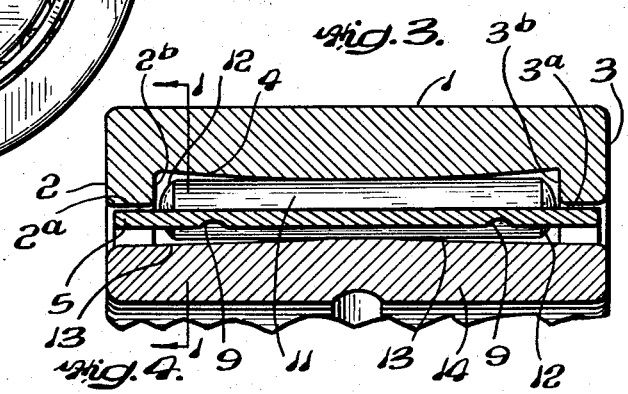
Figure 4:
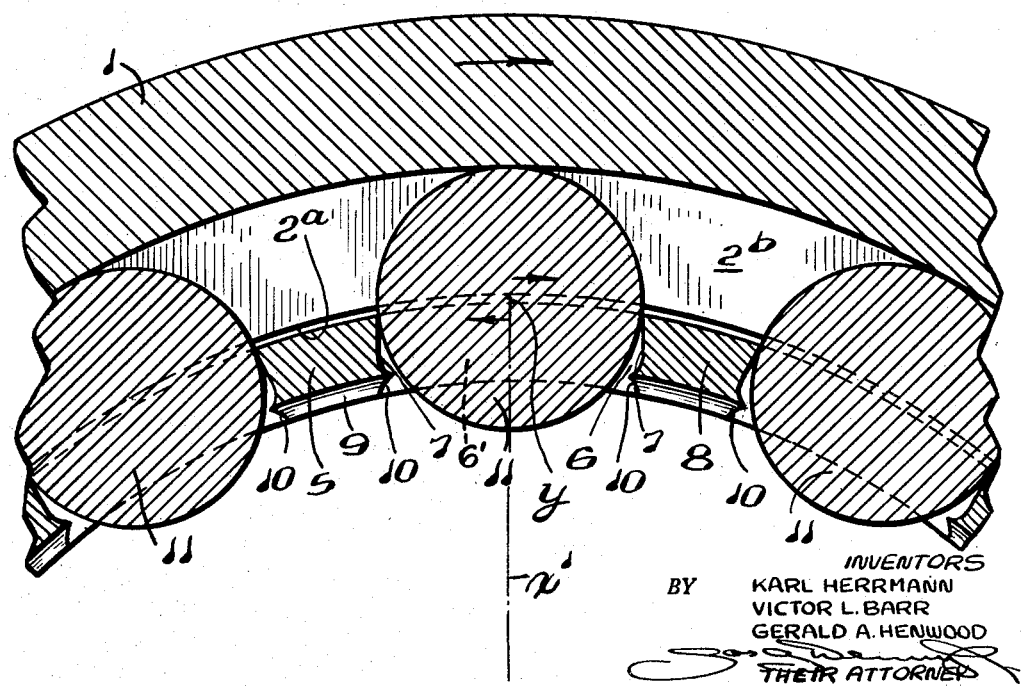

In the drawings, Fig. 1 is a side elevation, with parts broken away to show the interior construction, illustrating the embodiment of our improvements in a needle roller bearing having integral side ribs on an outer race ring; Fig. 2 is a top plan view of the bearing shown in Fig. 1 with a part of the race ring broken away to show the cage and rollers and the random lengths of the latter; Fig. 3 is a transverse sectional view taken on the line 3—3 of Fig. 1; Fig. 4 is a greatly magnified view of the portion of the bearing within the dash and dot circle of Fig. 1 with the inner race ring omitted; Fig. 5 is an external view of a fragment of the cage and of some of the rollers shown in Fig. 1; Fig. 6 is a transverse sectional view taken on the line 6—6 of Fig. 5; Fig. 7 is an internal view of a portion of the fragment of the cage shown in Fig. 5; Fig. 8 is a fragmentary transverse sectional view illustrating the positioning of a roller about to be pressed through a cage window into the race ring; Fig. 9 is a sectional view, taken along the line 9—9 of Fig. 10, illustrating the formation of roller retainers on the guiding bars by grooving the inner walls of the bars by means of a peripherally ridged rotary swage; Fig. 10 is an irregular sectional view taken on the line 10—10 of Fig. 9; Fig. 11 is a side elevation of a modified form of cylindrical needle roller bearing embodying our improvements, with parts broken away to show the interior construction; Fig. 12 is a greatly magnified view of a portion of the bearing shown in Fig. 11 taken on the line 12—12 of Fig. 13 with the inner race ring omitted; Fig. 13 is a transverse sectional view of the bearing shown in Fig. 11; Fig. 14 is a diagrammatic view illustrating the formation of retainers on the guiding bars of a cage by means of a toothed rotary swage; Fig. 15 is a fragmentary view illustrating the embodiment of our improvements in a needle roller bearing having side ribs on an inner race ring, with one of the rollers positioned for insertion into the raceway through a cage window.

In Figs. 1 to 10 of the drawings, we have illustrated the embodiment of our invention in a cylindrical needle roller bearing comprising an outer race ring 1 provided with axially spaced, symmetrical integral radial rigs or flanges 2 and 3 which have complementary annular, symmetrical faces 2a and 3a in a common cylindrical plane, and complementary symmetrical, radial faces 2b and 3b extending transversely to the axis of the ring. A roller raceway lies between the faces 2b and 3b and is preferably axially convexed as indicated by the raceway 4 in Fig. 3. Such axial curvature of the raceway is ordinarily only sufficient to cause the rollers to bear more heavily at their centers than at their ends, or to afford sufficient clearance at the ends of the rollers to avoid pinching or concentrating loads on the ends of the rollers or at the outer edges of the raceway. The raceway may be cylindrical as shown in Fig. 13, instead of being axially curved.

A tubular, slotted guiding cage 5 is inserted in the race ring so that its jointless rim members overlie and make a slip fit with the annular surfaces 2a and 3a of the ribs 2 and 3. The ribs 2 and 3 constitute the sole support for the cage, and free running clearance is provided between the cage and ribs. Such clearance would ordinarily be of the order of, say, .005" or less so that there is no substantial radial play or floating of the cage within the race ring.

The slots in the cage form roller windows 6 each bounded by radial surfaces 6' of the cage rim members extending transversely to the axis of the cage and by the surfaces 7 of bar members 8 integral with the rim members.

The inner surfaces of the bars 8 are swaged to form grooves 9 from which metal is extruded laterally into the windows 6 to form retainers 10 for symmetrical cylindrical rollers 11, which are rotatable on their respective axes and which revolve in a cylindrical orbit having the axis of the cage as a center. Preferably each roller has rounded ends 12 whose centers of rotation lie in a pitch circle approximately coincident with the line of juncture between the annular peripheral surfaces of the cage rims and the annular surfaces 2a and 3a of the ring ribs 2 and 3.

The bars 8 are of greater peripheral width than radial thickness and the bar members and rim members each have inner and outer peripheral surfaces substantially parallel with one another and providing the cage with substantially unobstructed inner and outer surfaces of overall cylindrical contour. The roller contacting faces of the bar members and rim members lie between and transverse to such inner and outer surfaces. The transverse bar faces and the transverse rim faces bounding each window are parallel to one another at least as to the portions thereof adjacent to the pitch circle where they are contacted by and guide the rollers.

The rollers receive a portion of their guidance in operation from the contact of their peripheries with the parallel surfaces of adjacent bars at points adjacent to the pitch circle and less than half of the radial thickness of the bars 8 away from the peripheral surfaces thereof adjacent to the raceway 4 and consequently any tendency of a roller to ride up on the cage is obviated and any tendency toward cocking of the rollers or cage is minimized.

The symmetrical ends of the rollers 11 are preferably rounded by tumbling and, since their centers of rotation lie in a pitch circle approximately coincident with the line of juncture between the cage rims and the peripheral surfaces 2a and 3a, only a small portion of the roller end surfaces make contact with the rib surfaces 2b and 3b and the complementary rim surfaces 6' of the cage 5. Any tendency to axial displacement of the cage is checked by engagement of the roller ends with such surfaces of the relatively rotatable ring and cage.

The rollers are preferably of random lengths as obtained in automatic shearing and tumbling equipment but may have the centers of their ends ground to provide greater lineal uniformity.

As indicated in Figs. 1 to 3 the rollers are normally supported by the axially convexed surface 13 of an inner race ring 14. But the inner race ring may be dispensed with, as indicated in Fig. 4, and the bearing sleeved directly on a shaft, trunnion, or the like. The retainers 10 are ordinarily out of contact with the rollers when they contact an inner race ring, shaft or trunnion.

To secure the requisite relationship of the moving and guiding parts, each roller should have a radius approximating the orbital radial distance between the apex of the raceway 4 and the common cylindrical plane of the surfaces 2a and 3a. The cage should have an outer diameter approximating the diameter of the pitch circle of axes of the rollers. Deviations are permissible for clearance and manufacturing exigencies but the zone containing the line of juncture should not deviate from the pitch circle by more than ten percent of a roller diameter. The cage should have a wall thickness not appreciably exceeding one-third of the roller diameter, and the width of the cage windows should be only slightly greater than the roller diameter.

As a result of such proportions and arrangements, the axes of rotation of the rollers move in a pitch circle approximately coincident with the line of juncture between the annular bearing surfaces of the ribs and the cage, and each roller of the bearings shown in Figs. 1 to 14 is symmetrically guided adjacent to the pitch circle by contact of areas of its ends lying within the pitch circle with radial surfaces 6' of the cage rims and by contact of areas of its ends without the pitch circle with radial surfaces 2b and 3b of the ribs 2 and 3. No substantial areas adjacent to an orbital radius intersecting a roller axis and lying within and without the pitch circle both contact the radial surfaces of the cage rims or both contact the surfaces of the ring ribs. Consequently the movements of such areas of a roller end in opposite directions during the epicyclic movement of the roller does not set up opposite (and frequently unequal) stresses against a single continuous surface of a rib or of a rim.

If, by way of illustration, it be considered that force is applied to the ring 1 causing its clockwise rotation, the rollers will be moved epicyclically in a cylindrical orbit about the bearing axis x. If an orbital radius x' be deemed projected from the axis x through the axis y of a roller 11, then each end area of the roller adjacent to such radius and outside of the pitch circle will move around the axis y in the direction of orbital movement of the roller and the portion of such area near the axis y will contact and be guided by a surface 2b or 3b. At the same instant, each end area of a roller adjacent to such orbital radius and within the pitch circle will move around the axis y, counter to the direction of orbital movement of the roller, and the portion of such area near the axis y will contact and be guided by radial surface 6' of the cage whose moveability relatively to the ring will relieve the stresses otherwise resulting from such opposite movements of roller end areas against a continuous surface, whether such continuous surface be on a rib or rim.

The grooving of the bars 8 to form the extruded roller retainers 10 may be conveniently effected by seating a cage 5 in the cylindrical seat of a chuck A and securing it against rotation therein by means of clamps B which press the end of the cage tightly against a shoulder of the chuck seat. A rotary swage provided with ridges C is mounted on a shaft D and rotated against the inner surfaces of the bars 8 so as to form the spaced grooves 9 and the extruded retainers 10.

The cage is seated on the surfaces 2b and 3b of a race ring and rollers 11 are pressed through the windows 6 into the channel between the ribs 2 and 3. The sheet material, preferably steel, of which the cage 5 is composed is sufficiently resilient to permit the rollers 11 to be snapped past the retainers 10 and permit the latter to spring back into position preventing the rollers from dropping out of the windows.

In Figs. 11 to 14 of the drawings is shown a modified construction embodying our invention in which the raceway 4' is made cylindrical; the ends 12' of the rollers 11 are chamfered at an angle to approximately 45°; the diameter of the line of juncture between the end rims of the cage 5 and the surfaces 2a and 3a of the ribs 2' and 3' is slightly greater than the diameter of the pitch circle of the rollers 11 and the retainers 10' consist of lips swaged into the windows by means of teeth C' on the swage ridges C. In this construction the inner race ring 14' has a cylindrical roller-engaging face.

In this modification of the invention, the peripheral surfaces of the rims of the cage 5 and the peripheral surfaces 2a and 3a of the cage ribs 2' and 3' (and consequently the line of juncture between such peripheral surfaces) lie outward from the pitch circle of the rollers 11, but less than 10% of the roller diameter outward from such pitch circle. Hence each roller end area moving contra to the orbital direction of movement of the roller will contact a radial surface of the cage only but such surface will also contact a small and inconsequential portion of the roller end area, moving in the orbital direction of movement of the roller and the bulk of the latter area will contact a radial face of a rib.

The points of guiding contact between the rollers and the walls of the cage windows lie further within the windows than in the embodiment illustrated in Figs. 1 to 10. But such contact points are still less than half of the radial thickness of a bar away from the circumferential surface thereof nearer to the raceway 4'. Consequently guidance of the rollers in operation is primarily from contact of their peripheral surfaces with transverse faces of the cage at points adjacent to the pitch circle of the rollers and is little if any impaired by contacts of the roller ends with their relatively movable guides.

In Fig. 15 we have illustrated the embodiment of our invention in a cylindrical needle roller bearing having an inner race ring 100 having on each side thereof a side rib 102 whose peripheral surfaces make a slip fit with the rims of a cage 105 so that the line of juncture between the cage rims and the ring ribs is approximately coincident with the pitch circle of the roller 111. In assembling this bearing, the rollers are forced inward past the retainers 110 which were previously formed by extruding metal from the grooves 109 in the bars 108. The retainers spring back into place after the rollers are forced past them and prevent the rollers dropping out when there is no outer race ring or housing to support them.

In this embodiment, the cages are carried by the ribs 102 and not by the rollers and the rollers receive the major portion of their guidance in operation from contact of their peripheries with transverse faces of the bars 108 adjacent to the pitch circle of the rollers 111 and at contact points on such faces less than half the radial thickness of the bars away from the surfaces thereof nearer to the raceway 104 between the ribs 102. The guidance of the ends of the rollers is substantially the same as above described excepting that the areas within the pitch circle engage ribs and the areas without the pitch circle engage rim surfaces instead of vice versa as in previous examples.

The retainers 110 are normally out of contact with the peripheries of the rollers in the operation of the bearing, and are pressed from the bars 108 adjacent to the surfaces thereof remote from the raceway 104 and within the general surface contour of the case.

From the foregoing it will be seen that our improvements effect approximate pitch circle guidance of the rollers by contact of their peripheries, at or about the pitch circle, with rigid cage bars adjacent to corners of the bars nearest to the raceway of a ring provided with integral guide ribs and thereby effect maximum guidance with minimum stress, and also eliminate or minimize impairment of rolling motion by stresses resulting from end contacts.

In operation, the continuous radial surfaces (transverse to the orbital axis) of the symmetrical ribs and rims each, at least frequently, contact an end of each roller so that the area of such end located on one side of the pitch circle (adjacent to an orbital radius intersecting the roller axis) contacts, at any instant of contact, a portion of one of such surfaces only. At the same instant, the major portion of the corresponding area of such end adjacent to such radius but on the other side of the pitch circle is out of contact with any portion of the last named surface but is generally contacted by a portion of the other of the aforesaid surfaces. Since such surfaces lie on opposite sides of the pitch circle and are movable relatively to one another around the orbital axis, the reverse stresses due to the reverse movements of such roller end areas are absorbed or minimized. Thus our improvements accentuate the advantages of cylindrical needle bearings and obviate the defects thereof and of the cages heretofore used and give greatly increased life and load carrying capacity.

Having described our invention, we claim:

1. A roller bearing comprising a single piece race ring having spaced side ribs integral with said ring and bordering a raceway, cylindrical rollers rotatable and orbitally movable in said raceway with their axes of rotation in a pitch circle, concentric with the orbit of said rollers and having symmetrical ends, a cage having continuous rims overlying and guided by said ribs, said cage containing windows having circumferential widths greater than the diameters of said rollers throughout the major portion of their lengths and permitting said rims to ride on said ribs and make a juncture therewith substantially coincident with said pitch circle, said ribs and rims having radial surfaces transverse to the axis of said orbit and each at least frequently contacting an end of each of said rollers and none of said radial surfaces projecting substantially across said pitch circle, each end of each roller having on one side of the pitch circle an area adjacent to an orbital radius intersecting the roller axis, said area contacting at an instant of contact a radial surface aforesaid on one side of said pitch circle, and substantially all of the area of the same roller end on the opposite side of the pitch circle being then free from contact with any radial surface aforesaid which is immovable relatively to the radial surface contacted by the last previously named area.

2. A cylindrical needle roller bearing comprising a race ring having integral symmetrical side ribs with a raceway between them, a tubular guiding cage having uninterrupted rim members overlying and making a slip fit with said ribs and having bar members connecting said rim members and forming therewith roller windows having an axial length no greater than the axial distance between said ribs, said members having inner and outer surfaces parallel with one another over the major portions of the circumferential areas of said members and having roller contacting faces between and transverse to said parallel surfaces, and rollers of random lengths and having symmetrically convexed ends lying in said raceway and windows and having end centers of rotation in a pitch circle having a diameter approximating the diameter of said ribs, said rollers receiving a major portion of their guidance when rolling from contact of their surfaces with said transverse faces at points adjacent to the pitch circle of the rollers.

3. A cyclindrical needle roller bearing comprising a race ring having side ribs with a raceway between them, a tubular guiding cage having rim members overlying and making a slip fit with said ribs and having bar members connecting said rim members and forming therewith roller windows between said ribs, said members having inner and outer surfaces parallel with one another over the major portions of the circumferential areas of said members and having roller contacting faces between and transverse to said parallel surfaces, and rollers lying in said raceway and windows and having end centers of rotation in a pitch circle having a diameter approximating the diameter of said ribs, said rollers each having a length several times its diameter and each receiving the major portion of their guidance in operation from contact of their surfaces with said faces, and said bars having spaced roller retainers pressed therefrom adjacent to the surfaces thereof remote from said raceway and within the general surface contour of the cage.

4. A cylindrical roller bearing comprising a race ring having similar side ribs thereon spaced to form a raceway between them and provided with annular bearing surfaces, a tubular cage having uninterrupted rims with peripheral surfaces slideably mounted on said annular surfaces and having slots therein between said ribs to form roller windows and cylindrical, symmetrical rollers of random lengths in said raceway and windows and having axially convexed ends whose centers of rotation lie in a pitch circle approximately coincident with the cylindrical plane common to said annular bearing surfaces.

5. A cylindrical roller bearing comprising a symmetrical race ring having side ribs thereon spaced to form a raceway between them and provided with annular bearing surfaces, a tubular cage making a loose slip fit with said annular surfaces and having slots therein forming roller windows, said windows extending entirely across but not beyond said raceway and having bars between them each having throughout greater circumferential width than radial thickness and forming side walls for the respective windows having substantially parallel surfaces over at least a portion of their radial thickness, and cylindrical, symmetrical rollers in said raceway and windows and having their centers of rotation in a pitch circle approximately coincident with said annular surfaces, said rollers each having a length several times its diameter and being guided by contact at approximately the pitch circle of its circumferential surface with portions of said parallel walls adjacent to the corners formed thereby with a circumferential surface of said cage.

6. A cylindrical roller bearing comprising a race ring having spaced side ribs thereon with a raceway between them and having annular bearing surfaces, a cylindrical cage making a slip fit with said surfaces and having slots therein between said ribs and forming roller windows, and cylindrical rollers of random lengths in said raceway and projecting through said windows and each having symmetrical ends which are axially convexed and whose centers of rotation lie in a pitch circle approximately coincident with the line of juncture between the cage and said bearing surfaces, the diameter of said rollers being less than the circumferential width of said windows and said rollers being guided by contact at approximately the pitch circle of roller surfaces with corner portions of said cage adjacent to the pitch circle.

7. A cylindrical roller bearing comprising a race ring having thereon side ribs symmetrical with one another and provided with annular bearing surfaces, a cylindrical cage making a slip fit with said surfaces and having slots therein between said ribs to form roller windows, and cylindrical rollers of random lengths disposed in said raceway and windows and having a diameter at least thrice the thickness of the wall of said cage and having axially convexed ends whose centers of rotation lie in a pitch circle approximately coincident with the line of juncture between the cage and said bearing surfaces the portion of each window nearest the pitch circle having a width circumferentially greater than the diameter of the roller in such window.

8. A cylindrical needle roller bearing comprising a race ring having symmetrical side ribs with an axially convexed raceway between them, a guiding cage having rim members making a slip fit with said ribs and having bars connecting said rim members and forming therewith roller windows, and rollers having symmetrical convexed ends in said windows, said rollers each having a diameter less than the width of the portion of its window nearest to the pitch circle and having its center of rotation in a pitch circle substantially coincident with the lines of juncture between said ribs and rims.

9. A cylindrical needle roller bearing comprising a race ring having side ribs with a raceway between them, a tubular guiding cage having rim members extending over and making a slip fit with said ribs and having bar members connecting said rim members and forming therewith roller windows between said ribs, said members having inner and outer surfaces parallel with one another over the major portions of the circumferential areas of said members and having roller-contacting faces between and transverse to said parallel surfaces, one of said parallel surfaces being nearer said raceway than the other, and rollers lying in said raceway and windows and having end centers of rotation in a pitch circle having a diameter approximating the diameter of said ribs, said rollers each having a length several times its diameter and receiving the primary portion of its guidance in operation from contact of their peripheries with said transverse faces of said bars substantially coincident with the pitch circle of said rollers and at points on said faces less than half the radial thickness of said bars away from the surface thereof aforesaid nearer to said raceway, and the portion of each window nearest to the pitch circle having a circumferential width greater than the diameter of the roller in such window.

10. A cylindrical needle roller bearing comprising a race ring having symmetrical side ribs with a raceway between them, a tubular guiding cage having jointless rim members overlying and making a slip fit with said ribs and having bar members connecting said rim members and forming therewith roller windows between said ribs, said members having inner and outer surfaces parallel with one another over the major portions of the circumferential areas of said members and having roller-contacting faces between and transverse to said parallel surfaces, and rollers having symmetrical ends and lying in said raceway and windows and having end centers of rotation in a pitch circle having a diameter approximating the diameter of said ribs, said rollers each having a diameter at least thrice the thickness of an adjacent bar and a substantially greater length than diameter and receiving the greater or a major portion of their guidance in operation from contact of their peripheral surfaces with said transverse faces at points approximately coincident with the pitch circle of the rollers, the portion of each window nearest to the pitch circle having a width greater than the diameter of the roller in such window.

References Cited in the file of this patent

UNITED STATES PATENTS

| | | |
|---|---|---|
| 1,765,648 | Bott | June 24, 1930 |
| 2,044,168 | Heim | June 16, 1936 |
| 2,044,663 | Brodin | June 16, 1936 |
| 2,259,324 | Robinson | Oct. 14, 1944 |
| 2,503,070 | Reiss | Apr. 4, 1950 |

FOREIGN PATENTS

| | | |
|---|---|---|
| 410,891 | Great Britain | May 31, 1934 |